(12) United States Patent
Lindoff et al.

(10) Patent No.: US 8,547,821 B2
(45) Date of Patent: Oct. 1, 2013

(54) METHOD AND APPARATUS FOR INVESTIGATING WHETHER A GIVEN SIGNAL IS RECEIVED IN A GIVEN SET OF OFDMA RESOURCE ELEMENTS

(75) Inventors: Bengt Lindoff, Bjärred (SE); Tobias Rydén, Täisy (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 376 days.

(21) Appl. No.: 12/921,926

(22) PCT Filed: Mar. 6, 2009

(86) PCT No.: PCT/EP2009/052669
§ 371 (c)(1),
(2), (4) Date: Sep. 28, 2010

(87) PCT Pub. No.: WO2009/112435
PCT Pub. Date: Sep. 17, 2009

(65) Prior Publication Data
US 2011/0007658 A1    Jan. 13, 2011

Related U.S. Application Data

(60) Provisional application No. 61/035,921, filed on Mar. 12, 2008, provisional application No. 61/077,950, filed on Jul. 3, 2008.

(30) Foreign Application Priority Data

Jul. 1, 2008 (EP) ..................................... 08159461

(51) Int. Cl.
*H04J 11/00* (2006.01)

(52) U.S. Cl.
USPC ........................................................ 370/208

(58) Field of Classification Search
USPC ................. 370/203, 204, 208, 241, 252, 351, 370/201, 431, 463, 464
See application file for complete search history.

(56) References Cited

U.S. PATENT DOCUMENTS

2005/0276340 A1* 12/2005 Chow et al. .................... 375/260
2007/0280366 A1* 12/2007 Aytur et al. .................... 375/260
2007/0281649 A1  12/2007 Maeda et al.

FOREIGN PATENT DOCUMENTS

| JP | 2007013627 A | 1/2007 |
| JP | 2007324754 A | 12/2007 |
| JP | 4685937 B2 | 5/2011 |
| WO | 2006/130502 A2 | 12/2006 |
| WO | 2008010283 A1 | 1/2008 |

* cited by examiner

*Primary Examiner* — Omar Ghowrwal
(74) *Attorney, Agent, or Firm* — Coats and Bennett, P.L.L.C.

(57) ABSTRACT

A method for investigating a signal in an OFDMA transmission is disclosed. The method comprises receiving the OFDMA transmission and obtaining a resource grid comprising resource elements of the transmission; determining a set of pairs of the resource elements, wherein the resource elements of the pair are disjoint; for each pair, comparing signals of the resource elements of the pair; determining a statistical test value based on the comparisons; and processing the statistical test value to obtain a desired output about the signal. A computer program for implementing the method, a receiver arrangement adapted to perform such investigation, and a communication apparatus using such receiver arrangement are also disclosed.

20 Claims, 4 Drawing Sheets

METHOD AND APPARATUS FOR INVESTIGATING WHETHER A GIVEN SIGNAL IS RECEIVED IN A GIVEN SET OF OFDMA RESOURCE ELEMENTS

TECHNICAL FIELD

The present invention relates to a method for investigating a signal in an OFDMA transmission, a computer program for implementing the method, a receiver arrangement adapted to perform such investigation, and a communication apparatus using such receiver arrangement.

BACKGROUND

In the forthcoming evolution of mobile cellular standards like Global System for Mobile communications (GSM) and Wideband Code Division Multiple Access (WCDMA), new transmission techniques like Orthogonal Frequency Division Multiplexing (OFDM) will be used. Furthermore, in order to have a smooth migration from existing cellular systems to a new high capacity high data rate system in existing radio spectrum, the new system has to be able to operate in a flexible bandwidth. A proposal for such a new flexible cellular system is Third Generation (3G) Long Term Evolution (3G LTE), in everyday speech LTE, which can be seen as an evolution of the 3G WCDMA standard. This system will use OFDM as multiple access technique, called Orthogonal Frequency Division Multiple Access (OFDMA) in the downlink and will be able to operate on bandwidths ranging from 1.25 MHz to 20 MHz. Furthermore, data rates up to 100 Mb/s will be supported at the largest bandwidth. However, not only high rate services are expected to be used in 3G LTE, but also low rate services like voice. Since 3G LTE is designed for Transmission Control Protocol/Internet Protocol (TCP/IP), Voice over Internet Protocol (VoIP) will be the service carrying speech.

Another important aspect of LTE is the mobility function, hence synchronization symbols, cell search and antenna detection procedures are of major importance in order for the User Equipment (UE) to detect and synchronize with other cells.

Figure 1:
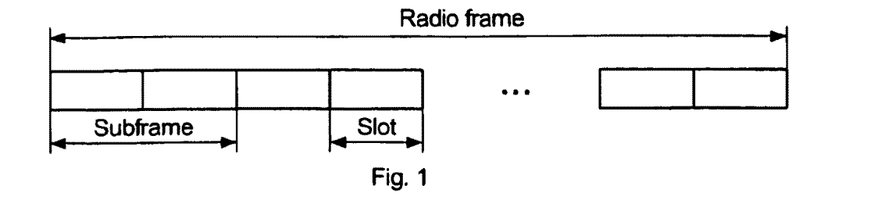
FIG. 1 schematically illustrates the frame structure of 3G LTE.
Figure 2:
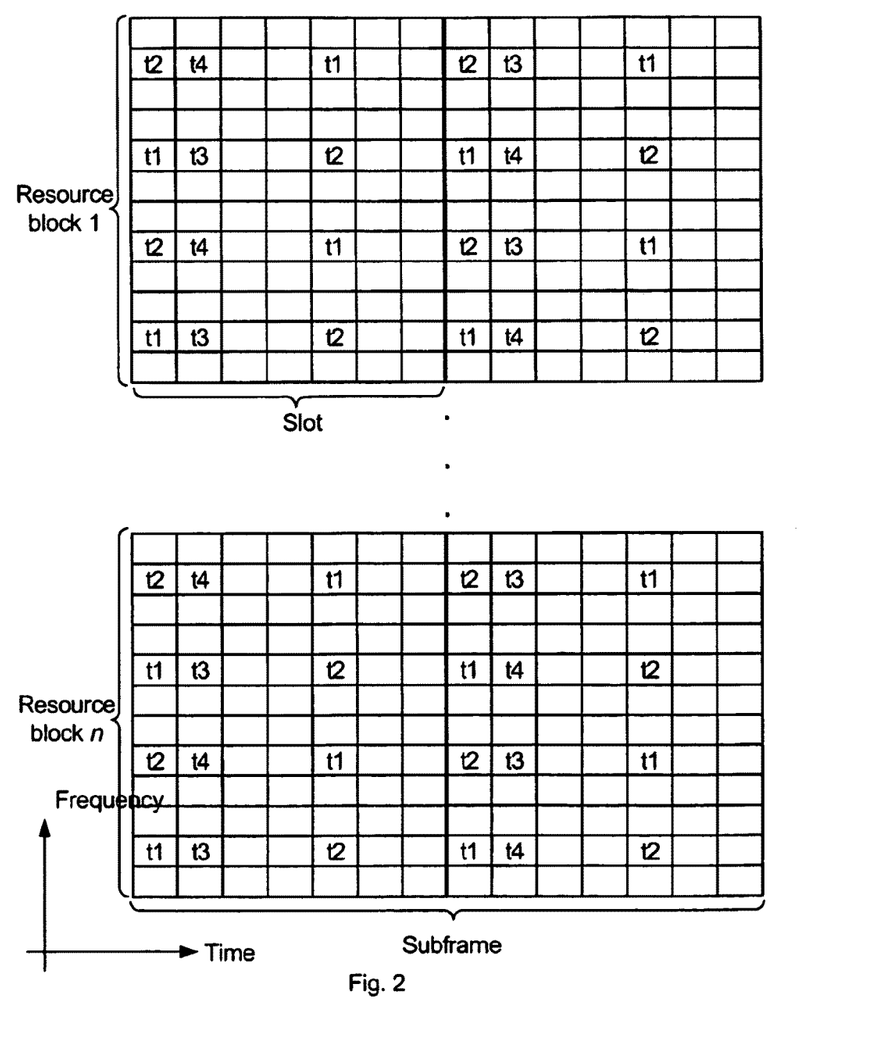
FIG. 2 schematically illustrates an example of a resource grid of sub-carriers and OFDM symbols.

FIG. 1 schematically illustrates the frame structure of LTE. The frame structure of LTE comprises a radio frame comprising ten sub-frames. Each sub-frame comprises two slots. The transmission can be described with a resource grid of sub-carriers and available OFDM symbols, as illustrated in. FIG. 2, which illustrates the example of normal cyclic prefix length. Each element in the resource grid is called a resource element (RE) and each RE corresponds to one complex-valued modulation symbol. The number of OFDM symbols per slot is seven for normal cyclic prefix length and six for extended cyclic prefix length. A basic scheduling unit is denoted a resource block. Thus, a resource block is defined as seven or six consecutive OFDM symbols in the time domain and twelve consecutive sub-carriers in the frequency domain.

To achieve high data rates, spatial division multiplexing of multiple data streams to a single user equipment (UE) may be provided. Two, and up to four transmit antennas can be used.

Within each downlink sub-frame, downlink control signalling is located in the first n OFDM symbols, where n is three or less. There is no mixing of control signalling and shared data in an OFDM symbol. Downlink control signalling can comprise a format indicator to indicate the number of OFDM symbols used for control in this sub-frame, scheduling control information, and acknowledgement indicator associated with uplink data transmission. The sub-frames also comprise reference symbols at specific locations in time and frequency of the grid for the respective transmit antennas.

A fundamental problem in LTE operation is to find out if a given known signal is sent in a given set of REs, or, which particular signal in a given set of possible signals that is sent in a given set of REs. This problem occurs for instance when a primary synchronization signal has been detected, and the UE needs to detect which of many possible secondary reference signals that is transmitted next to the primary one. Another instance of the problem occurs in so-called blind detection of a possible second (or third and fourth) eNode B transmit antenna port. In the presence of such an antenna port, certain known reference signals, t1-t4 for the antenna ports, respectively, are sent as indicated above, and may thus be used to detect the presence of a second, third or fourth antenna port by suitable processing of the signals received in these REs. The knowledge for the UE about the number of transmit antennas used is of major importance for good signal power measurements, i.e. mobility reasons, as well as for the possibility to decode the control channel, having different coding depending on the number of transmit antennas, once a handover to a new cell is needed.

Given is thus a set V of REs, or positions of ODFM symbols. Each element of V is a couple (i,k), where i is the time-index and k is the frequency-index of the RE in question. The question to answer is then either (i) was some given signal $r_{i,k}$, (i,k) $\in$ V, sent in the REs V, or (ii) given a set S={$r_{(i,k)}^p$, (i,k)$\in$V}, p=1, ..., P, of signals, which of the signals in this set was sent in the REs V?

The standard model for signal transmission in OFDM systems is $y_{i,k} = h_{i,k} s_{i,k} + e_{i,k}$, where $s_{i,k}$ is the transmitted signal, $h_{i,k}$ is the channel coefficient, $y_{i,k}$ is the received signal and $e_{i,k}$ is noise, all in RE (i,k). All these quantities are complex numbers; the $h_{i,k}$ often considered as random variables from a time-frequency random process, i.e. random field, while the $e_{i,k}$ are usually considered as independent, across time and frequency, complex symmetric Gaussian random variables with some, in general unknown, variance $\sigma^2$.

A straightforward approach to solve either of the above questions is to first compute an estimate $\hat{h}_{i,k}$ of $h_{i,k}$, then compute $\hat{s}_{i,k} = \hat{h}_{i,k}^{-1} y_{i,k}$ as an estimate of $s_{i,k}$ and finally compute the sum $$Q = \sum_{(i,k)\in V} r_{i,k}^* \hat{s}_{i,k}$$

where super-index * denotes complex conjugation. If the $s_{i,k}$ are indeed equal to the $r_{i,k}$, then the sum roughly equals $$Q = \sum_{(i,k)\in V} |r_{i,k}|^2$$

up to some noise, and is thus large. A large value of Q thus indicates that the signals $r_{i,k}$ were in fact transmitted, i.e. answer question (i) above. If it is to be decided on one candidate from a set of signals, i.e. question (ii) above, the signal yielding the largest value of Q is picked. This approach is known as coherent correlation. A problem with this approach is the estimation of the channel coefficients $h_{i,k}$. Typically it is assumed that $h_{i,k}$ is constant over some span of time and frequency, i.e. a time-frequency rectangle in the grid of REs. The estimate $\hat{h}_{i,k}$ is then computed for (i,k) within this rectangle as an average of ratios $y_{i,k}/r_{i,k}^*$, where the $r_{i,k}^*$ are some known signals transmitted within the time-frequency rectangle and the indices (i', k') range over the REs within the rectangle where these known signals are sent; the average forming $\hat{h}_{i,k}$ is hence computed over the same indices. The known signals $r^*_{i,k}$ can be e.g. parts of the primary synchronization signal, when it has been detected, which is placed close to the secondary synchronization signal, or they can be reference signals from antenna port 0, which is always present. To compute $\hat{h}_{i,k}$ over different indices (i,k), the rectangle moves along. In short, $\hat{h}_{i,k}$ is computed as a local average in the time-frequency RE domain. Sometimes this is a weighted average, where REs close to (i,k) are given larger weights.

Now, since the $h_{i,k}$ arise from a random process, they are not constant over the time-frequency rectangle, and therefore, the local average forming $\hat{h}_{i,k}$ will suffer from bias as an estimator. If the rectangle is chosen large, this bias will be large, in particular in case of large speed and thus Doppler spread, and large delay spreads. On the other hand, if the time-frequency rectangle is small, the variance of $\hat{h}_{i,k}$ will become large because the average has few terms.

Another problem with coherent correlation is that if there is a frequency error in the local receiver's local oscillator, this will introduce a phase shift, $\Delta$ say, per RE time unit, i.e. OFDM symbol. This will in turn affect the value of Q above. Thus one often considers the absolute value |Q|, rather than Q itself.

Yet another problem with coherent correlation pertains to question (i) above; how large should Q, or |Q|, be in order to decide that the signals $s_{i,k}$ were sent? The appropriate threshold depends on the transmission power and the noise level, of which at least the latter is not known exactly. Thus it is typically problematic to determine an appropriate threshold.

Thus, there is a need for at least one of an improved approach to determine if a given signal is sent in a given set of OFDM symbols, i.e. to answer question (i) above, and an improved approach to determine what signal that was sent, i.e. to answer question (ii) above.

SUMMARY

An object of the invention is to at least alleviate the above stated problem. The present invention is based on the understanding that According to a first aspect, there is provided a method for investigating a signal in an OFDMA transmission, the method comprising receiving the OFDMA transmission and obtaining a resource grid comprising resource elements of the transmission; determining a set of pairs of the resource elements, wherein the resource elements of each pair are disjoint; for each pair, comparing signals of the resource elements of each pair; determining a statistical test value based on the comparisons; and processing the statistical test value to obtain a desired output about the signal.

The desired output about the signal may be an output signal indicating if a given signal was sent in a given set of OFDM symbols, i.e. answer to question (i) above, and/or indicating what signal that was sent, i.e. answer to question (ii) above.

The processing of the statistical test value may comprise comparing the statistical test value with a threshold associated with a quantile for a statistical distribution of the statistical test value; and if the statistical test value is below the threshold, consider the signals of the resource elements of the pairs as present, or if the statistical test value is above the threshold, consider the signals of at least some of the resource elements of the pairs as missing.

The determining of any of the pairs may comprise determining reference signals associated to a certain transmit antenna port such that the consideration of present and missing signals, respectively, is an estimate of the number of transmit antennas used at a transmitting station making the transmission.

The determination of the statistical test value may be made for each possible signal of the resource elements, and the processing comprises determining the statistical test value for the possible signal having the smallest value, wherein the received signal is considered that possible signal.

The signals of the resource elements of the pairs may comprise a secondary synchronisation signal short code set, and the determining of the pairs may then comprise selecting signals of the resource elements of the pairs from one OFDM symbol. The signals of the resource elements of each pair may be selected from adjacent subcarriers, or be selected from subcarriers that are two subcarriers apart.

The method may further comprise substituting the signal of a resource element of any of said pairs with an average signal of at least two other signals of resource elements before the comparison.

According to a second aspect, there is provided a computer program comprising computer program code comprising instructions to cause a processor on which the computer program code is executed to perform the method according to the first aspect.

According to a third aspect, there is provided a receiver arrangement comprising a receiver arranged to receive an OFDMA transmission and obtain a resource grid comprising resource elements of the transmission; and a signal processor for investigating a signal in the OFDMA transmission, the signal processor being arranged to determine a set of pairs of the resource elements, wherein the resource elements of the pair are disjoint; compare, for each pair, signals of the resource elements of the pair; determine a statistical test value based on the comparisons; and process the statistical test value to obtain a desired output about the signal.

The desired output about the signal may be an output signal indicating if a given signal is sent in a given set of OFDM symbols, i.e. answer to question (i) above, and/or indicating what signal that was sent, i.e. answer to question (ii) above.

The receiver arrangement may further comprise a comparator arranged to compare the statistical test value with a threshold associated with a quantile for a statistical distribution of the statistical test value; and if the statistical test value is below the threshold, consider the signals of the resource elements of the pairs as present, or if the statistical test value is above the threshold, consider the signals of at least some of the resource elements of the pairs as missing.

The receiver arrangement may further comprise an estimator arranged to estimate the number of transmit antennas used at a transmitting station making the transmission by determining reference signals associated to a certain transmit antenna port such that the consideration of present and missing signals, respectively, form the estimate of used transmit antennas.

The receiver arrangement may further comprise a signal determinator arranged to make the statistical test value for each possible signal of the resource elements, and determine the statistical test value for the possible signal having the smallest value, wherein the received signal is considered that possible signal.

According to a fourth aspect, there is provided a communication apparatus comprising a receiver arrangement according to the third aspect.

Any of the aspects relies on forming a statistical test value which is statistically processed. With a consideration of a proper statistical distribution of the test value, a desired output giving information about the signal is achievable.

The statistical test value may be $$\sum_{a=1}^{n} |z_{1a} - z_{2a}|^2$$

where $z_{1a}$ is the product of the received signal and the complex conjugate of an expected reference signal for the signal of one of the resource elements of pair a, a is 1 ... n, $z_{2a}$ is the product of the received signal and the complex conjugate of an expected reference signal for the signal of the other resource element of the pair a, and n is the number of pairs used for comparisons. The statistical distribution may then be $\sigma^2\chi^2(2n)$.

The statistical test value may be $$F = \frac{\sum_{a=1}^{n} |z_{1a} - z_{2a}|^2}{2n} \Big/ \frac{\sum_{b=1}^{m} |z'_{1b} - z'_{2b}|^2}{2m}$$

where $z_{1a}$ is the product of the received signal and the complex conjugate of an expected reference signal for the signal of one of the resource elements of pair a, a is 1 ... n, $z_{2a}$ is the product of the received signal and the complex conjugate of an expected reference signal for the signal of the other resource element of pair a, and n is the number of pairs used for comparisons, $z'_{1b}$ is the product of the received signal and the complex conjugate of an expected reference signal for the signal of one of the resource elements of pair b, b is 1 ... m, $z'_{2b}$ is the product of the received signal and the complex conjugate of an expected reference signal for the signal of the other resource element of pair b, and m is the number of pairs in a second set of pairs of resource elements selected from the resource grid such that their signals are known to be present. The statistical distribution may then be an F-distribution with 2n,2m degrees of freedom.

The statistical test value may be $|Z_1|^2+|Z_2|^2-2|Z_1^H Z_2|$, where $Z_1$ and $Z_2$ are vectors of length n with elements $z_{1a}$ and $z_{2a}$, respectively, where n is the number of pairs, $z_{1a}$ is the product of the received signal and the complex conjugate of an expected reference signal for the signal on one of the resource elements of pair a, $z_{2a}$ is the product of the received signal and the complex conjugate of an expected reference signal for the signal of the other resource element of pair a, a is 1 ... n, and superscript H denotes Hermitian transpose. The statistical distribution may then be approximately $\sigma^2\chi^2(2n-2)$.

The statistical test value may be $$F = \frac{\frac{|Z_1|^2 + |Z_2|^2 - 2|Z_1^H Z_2|}{2n - 2}}{\frac{|Z_1'|^2 + |Z_2'|^2 - 2|Z_1'^H Z_2'|}{2m - 2}}$$

where $Z_1$ and $Z_2$ are vectors of length n with elements $z_{1a}$ and $z_{2a}$, respectively, where n is the number of pairs, $z_{1a}$ is a product of the received signal and the complex conjugate of an expected reference signal for the signal on one of the resource elements of pair a, $z_{2a}$ is a product of the received signal and the complex conjugate of an expected reference signal for the signal of the other resource element of pair a, a is 1 ... n, $Z'_1$ and $Z'_2$ are vectors of length in with elements $z'_{1b}$ and $z'_{2b}$, respectively, where m is the number of pairs, $z'_{1b}$ is a product of the received signal and the complex conjugate of an expected reference signal for the signal of one of the resource elements of pair b, b is 1 ... m, $z'_{2b}$ is a product of the received signal and the complex conjugate of an expected reference signal for the signal of the other resource element of pair b, and m is the number of pairs in a second set of pairs of resource elements selected from the resource grid such that their signals are known to be present, and superscript H denotes Hermitian transpose. The statistical distribution may then be an F-distribution with 2n−2, 2m−2 degrees of freedom.

DETAILED DESCRIPTION

The idea of the invention is to partition a set V of resource elements (REs) in which a hypothesized signal is sent as $V=V_1 \cup V_2$ where $V_1=\{v_{11}, v_{12}, \ldots, v_{1n}\}$ and $V_2=(v_{21}, v_{22}, \ldots, v_{2n})$ are disjoint subsets of equal size n, i.e. the size of V is thus 2n, and then to make pair-wise comparisons of the signals received in REs $v_{1a}$ and $v_{2a}$ respectively, for a=1, 2, ..., n. In the following subsections, the details for questions (i) and (ii) above are given.

To answer the question 'Was some given signal $r_{i,k}$, (i,k)∈V, sent in the REs V?', as stated in question (i) above, an approach is to compute $z_{1a} = r^*_{i,k} y_{i,k}$ for a=1, 2, ..., n, where (i,k)=$v_{1a}$, and $z_{2a} = r^*_{i,k} y_{i,k}$ for a=1, 2, ..., n, where (i,k)=$v_{2a}$.

That is, for each RE in V the received signal is correlated with the possible transmitted signal, and then the results are sorted according to the partition of V.

Under the assumed signal transmission model above, it is found that $$z_{1a} = r^*_{i,k} s_{i,k} h_{i,k} + r^*_{i,k} e_{i,k} \text{ for } a=1, 2, \ldots, n, \text{ where } (i,k) = v_{1a}, \text{ and}$$

$$z_{2a} = r^*_{i,k} s_{i,k} h_{i,k} + r^*_{i,k} e_{i,k} \text{ for } a=1, 2, \ldots, n, \text{ where } (i,k) = v_{2a}.$$

If the transmitted signal $s_{i,k}$ for $(i,k) \in V$ are indeed equal to the hypothesized $r_{i,k}$, then the above simplifies to $$z_{1a} = h_{i,k} + r^*_{i,k} e_{i,k} \text{ for } a=1, 2, \ldots, n, \text{ where } (i,k) = v_{1a}, \text{ and}$$

$$z_{2a} = h_{i,k} + r^*_{i,k} e_{i,k} \text{ for } a=1, 2, \ldots, n, \text{ where } (i,k) = v_{2a};$$

here it is assumed that $|r_{i,k}|^2 = 1$ for $(i,k) \in V$, but the case of other moduli is easily carried back to the above by multiplying by $r^*_{i,k}/|r_{i,k}|$.

Now the partition of V is assumed to be done in such a way that for each $a=1, 2, \ldots, n$, the REs $v_{1a}$ and $v_{2a}$ are close in the time-frequency domain. It then makes sense to assume, or approximate, that the channel coefficients in these two REs agree; $h_{i,k} = h_{i',k'}$ for $(i,k) = v_{1a}$ and $(i',k') = v_{2a}$. It is then found that $$z_{1a} - z_{2a} \in CN(0, 2\sigma^2),$$

where $CN(\mu, \tau)$ denotes the complex symmetric Gaussian distribution with mean $\mu$ and variance $\tau$, and the fact that $r^*_{i,k} e_{i,k} \in CN(0, \sigma^2)$ is used. This subtraction is indeed considered as a cornerstone of the invention; rather than estimating channel coefficients, these are cancelled out under the assumption that the transmitted signal equals the hypothesized one and that the channel coefficients agree within each pair being compared.

Since the real and imaginary parts of a $CN(0, 2\sigma^2)$ random variable are independent real Gaussian variables with variance $\sigma^2$, it is therefore found that $$|z_{1a} - z_{2a}|^2 \in \sigma^2 \chi^2(2)$$

where $\chi^2(q)$ is the $\chi^2$ distribution with q degrees of freedom. Furthermore, the differences $z_{1a} - z_{2a}$ are independent across a.

If, on the other hand, $s_{i,k}$ does not equal $r_{i,k}$ for some index $(i,k)$ involved in a pair $(z_{1a}, z_{2a})$, then there will be no cancellation of means in the difference $z_{1a} - z_{2a}$ and the square $|z_{1a} - z_{2a}|^2$ will tend to be larger than a $\sigma^2 \chi^2(2)$ random variable. Thus, using the test statistic $$C = \sum_{a=1}^{n} |z_{1a} - z_{2a}|^2$$

it can be concluded that the signal $s_{i,k}$ was indeed sent in the REs $(i,k) \in V$ if C is sufficiently small.

To decide what is "sufficiently small", it should be noticed that if $s_{i,k} = r_{i,k}$ for all $(i,k) \in V$, then $C \in \sigma^2 \chi^2(2n)$. To estimate $\chi^2$, a statistic C' is computed in an entirely analogous fashion, but based on signals in REs that are certain to contain a particular sequence. This signal can be e.g. the primary synchronization signal, or reference signal from antenna port 0, i.e. t1 as illustrated in FIG. 2, which is always present. Assuming that this other set of signals is split into m pairs, there is thus available a statistic $C'' \in \sigma^2 \chi^2(2m)$. The ratio $$F = \frac{C/2n}{C'/2m}$$

will then have an F-distribution with $(2n, 2m)$ degrees of freedom, and the (null) hypothesis that $s_{i,k} = r_{i,k}$ for $(i,k) \in V$, at level $\alpha$ is rejected, if F exceeds the $(1-\alpha)$-quantile of the F-distribution with $(2n, 2m)$ degrees of freedom. If F does not exceed this quantile, the hypothesis is not rejected and it can be concluded that the signal $s_{i,k}$ was sent.

Now consider the situation of determining which signal $r_{i,k}^{(p)}$, $p=1, \ldots, P$, that was transmitted in REs$(i,k) \in V$, i.e. the second question stated above. This problem is solved by computing the above statistic C for each of signal $r_{i,k}^{(p)}$, yielding numbers $C^{(p)}$, $p=1, \ldots, P$. The output of the selection procedure is then the signal whose index p has the smallest $C^{(p)}$.

Figure 3:
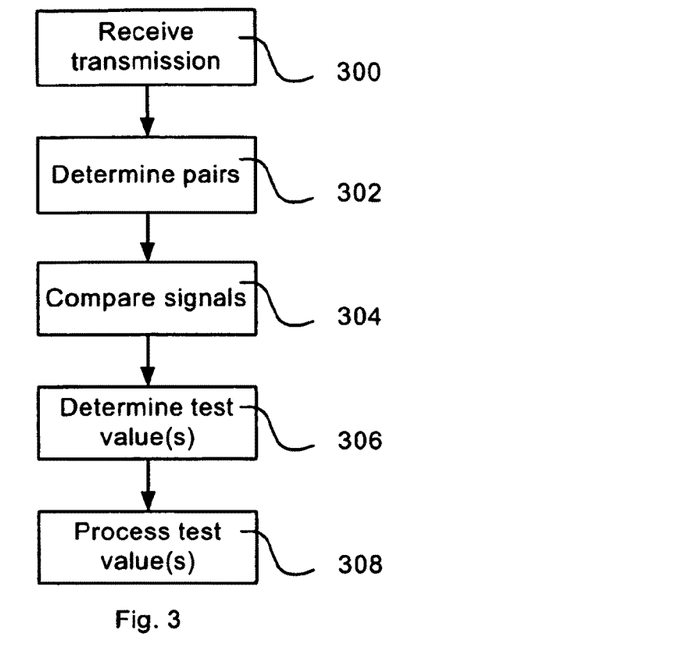
FIG. 3 is a flow chart illustrating a method.

These findings are utilised in a method, as illustrated in FIG. 3, for investigating a signal in an OFDMA transmission. Here, investigation means either to find if a signal is present or missing, or to find what signal that was transmitted in the transmission, i.e. decoding the signal. Of course, both of these achievements can be included in the act of investigating. The method comprises receiving the OFDMA transmission in a reception step 300, such that the resource grid, as for example illustrated in FIG. 2, is obtained. Pairs of disjoint REs are determined in a signal pair determination step 302. For example, for each pair, a first signal of one of the REs with reference signals associated with a certain transmit antenna, and a second signal of another of the REs with reference signals associated with the certain transmit antenna are selected. Similarly, further pairs comprising REs with reference signals associated with possible other transmit antennas can be formed. As a further example, pairs can also be determined from REs with reference signals associated with a first transmit antenna, which for some applications are known to always be present. The determined pairs then form basis for the investigation, which is, as elucidated above, performed by a pair-wise comparison of resource elements, or function of these, based on the formed pairs, e.g. each signal of the resource elements multiplied with a complex conjugate of an expected or possible transmitted signal and then forming a difference $z_{1a} - z_{2a}$, in an RE comparison step 304. One or more statistical test values are determined based on the compared REs, as also elucidated above, in a test value determination step 306, and then processed in a test value processing step 308. The test value C can be based on $|z_{1a} - z_{2a}|^2$ aggregated over all pairs a, where C has a $\sigma^2 \chi^2$ distribution. A test value F can also be based on the two disjoint subsets determined from in pairs of signals of REs in which a specific signal is known by the receiving entity to be present, e.g. with reference signals associated with only the first transmit antenna of the transmitting entity, as well as the aggregated $|z_{1a} - z_{2a}|^2$ over n pairs, forming the test value $$F = \frac{\sum_{a=1}^{n} |z_{1a} - z_{2a}|^2 / 2n}{\sum_{b=1}^{m} |z'_{1b} - z'_{2b}|^2 / 2m}$$

which has an F-distribution with 2n, 2m degrees of freedom. An advantage of this is that variance do not have to be determined separately.

During initial cell search, the local oscillator frequency may not be fully aligned with the actual system carrier frequency. The result of such a frequency error is a phase shift in the received signal per OFDM symbol time unit. Assuming that the two signals in each pair being compared are separated by a common distance in time, a more suitable model for the channel coefficients is then $h_{i,k}e^{j\Delta}=h_{i',k'}$ for $(i,k)=v_{1a}$ and $(i',k')=v_{2a}$, where $\Delta$ represents the phase shift incurred by the frequency error over the time between the two REs of each pair. In fact, the same model can be suitable even without a frequency error, then to some extent capturing Doppler shifts in the time direction or channel delay in the frequency direction. Thus, according to a further embodiment, vectors $Z_1$ and $Z_2$ of length n are formed, where n is the number of pairs, and the elements of the vectors are $z_{1a}$ and $z_{2a}$, respectively, $a=1\ldots n$, and the signals of the REs are multiplied with complex conjugates of expected or possible signals as demonstrated above. A statistic corresponding to C above is obtained by minimizing $|Z_1e^{j\Delta}-Z_2|^2$ over $\Delta\in[0,2\pi)$. By expanding the square $|Z_1e^{j\Delta}-Z_2|^2$ we find that it equals $|Z_1|^2+|Z_2|^2-2\text{Re}(e^{j\Delta}Z_2^HZ_1)$, where superscript H denotes Hermitian transpose. Clearly, this expression is minimized when, by choosing $\Delta$ suitably, the real part of $e^{j\Delta}Z_2^HZ_1$ equals its modulus $|Z_2^HZ_1|=|Z_1^HZ_2|$. The statistical test value C is then $|Z_1|^2+|Z_2|^2-2|Z_1^HZ_2|$. In this case, the statistical distribution is approximated to $\sigma^2\chi^2(2n-2)$. This approximation is found to work well in practical applications, where it is found that the distribution of C is reasonably well approximated by $\sigma^2\chi^2(2n-2)$, provided the transmitted signal $s_{i,k}$ for $(i,k)\in V$ is indeed equal to the hypothesized $r_{i,k}$. The embodiment may work satisfying also with the distribution of C approximated by distributions similar to $\sigma^2\chi^2(2n-2)$.

For the case of both handling a frequency error and avoiding determination of the variance separately, the statistical test value can be formed as $$F = \frac{\frac{|Z_1|^2+|Z_2|^2-2|Z_1^HZ_2|}{2n-2}}{\frac{|Z_1'|^2+|Z_2'|^2-2|Z_1'^HZ_2'|}{2m-2}}$$

where $Z_1$ and $Z_2$ are vectors of length n with elements $z_{1a}$ and $z_{2a}$, respectively, where n is the number of pairs, $z_{1a}$ is a product of the received signal and the complex conjugate of an expected reference signal for the signal on one of the resource elements of pair a, $z_{2a}$ is a product of the received signal and the complex conjugate of an expected reference signal for the signal of the other resource element of pair a, a is $1\ldots n$, $Z'_1$ and $Z'_2$ are vectors of length m with elements $z'_{1b}$ and $z'_{2b}$, respectively, where m is the number of pairs, $z'_{1b}$ is a product of the received signal and the complex conjugate of an expected reference signal for the signal of one of the resource elements of pair b, b is $1\ldots m$, $z'_{2b}$, is a product of the received signal and the complex conjugate of an expected reference signal for the signal of the other resource element of pair b, and m is the number of pairs in a second set of pairs of resource elements selected from the resource grid such that their signals are known to be present, and superscript H denotes Hermitian transpose. Here, the threshold is based on an F-distribution with $2n-2$, $2m-2$ degrees of freedom.

In the test value processing step 308, the obtained one or more test values are processed to obtain the desired information about the signal, i.e. if the signal is present or missing, and/or what the signal is. In the first alternative, information about the number of transmit antennas used at transmitting end can be gained. In the latter, the signal can be decoded. The signal can be decoded by forming test values for each possible signal, and determining the signal to be the one of them that is associated to the smallest test value. The test values are thus formed by multiplying the received signal with complex conjugates $r^*_{i,k}$ of all possible or expected signals $r_{i,k}$, following the notation above.

Figure 4:
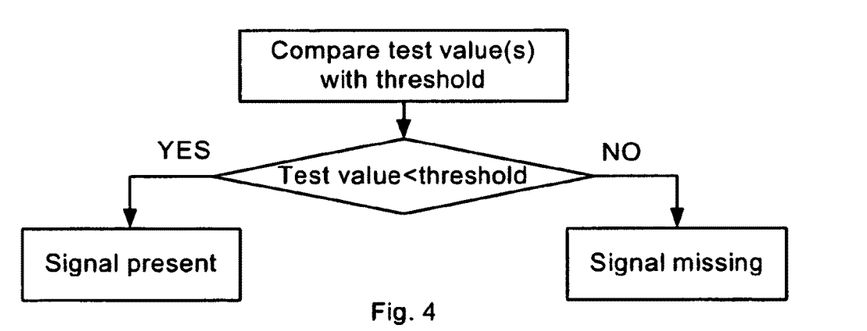
FIG. 4 is a flow chart illustrating an embodiment of processing of test value(s).

FIG. 4 is a flow chart illustrating an embodiment of processing of the test value. The statistical test value is compared with a threshold, wherein the threshold is associated with a quantile for the appropriate statistical distribution of the statistical test value. The appropriate statistical distribution for different statistical test values is discussed above. Based on the comparison with the threshold, the signal is considered present or missing, i.e. the signal is considered present when the statistical test value is below the threshold, and missing when above the threshold.

Figure 5:
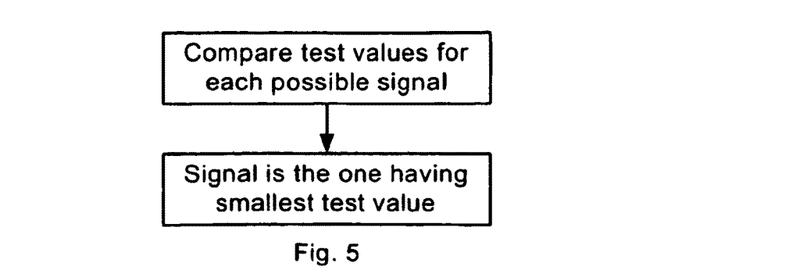
FIG. 5 is a flow chart illustrating an embodiment of processing of test value(s).

FIG. 5 is a flow chart illustrating an embodiment of processing of the test values. The test values for each possible signal that may be present are compared, wherein the signal associated with the smallest test value obtained is considered to be the received signal. One test value for each possible signal is thus formed for determining the received signal, as discussed above.

It has been demonstrated that a signal of an RE, or its function when considering an expected or possible signal, is compared with another. As an alternative, a virtual signal can be formed as an average of signals of two or more REs, and then be used as the signal of the RE in the way described above. This can be advantageous when high Doppler effects are present. For example, instead of comparing signal of t2 of symbol 1 of the first slot in FIG. 2 with signal t2 of symbol 1 of the second slot, a shorter distance in time is achieved by averaging the two signals of the t2s of symbol 5 of the first slot as illustrated in FIG. 2 and compare the formed virtual signal, i.e. the average, with signal t2 of symbol 1 of the second slot. Here, the assumption of unchanged channel is better in a fast changing signal environment, i.e. separation of 3 OFDM symbols instead of 7. Similar ways of action are possible for the other signals too.

Figure 6:
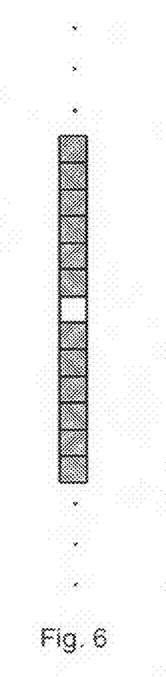
FIG. 6 schematically illustrates an OFDM symbol comprising a secondary synchronisation signal.

In LTE, the secondary synchronization signal (SSS) is sent on 62 consecutive, in the frequency domain, REs, except for a gap in the middle at the DC subcarrier, as illustrated in FIG. 6. In frequency domain duplex (FDD) systems, SSS is sent every 5th subframe, and immediately preceding the primary synchronization signal (PSS). In time domain duplex (TDD) systems, SSS is also sent every 5th subframe but 3 OFDM symbols after the PSS.

When the UE searches for new cells, either at start up or when already connected but searching for neighbouring cells, it first detects the cell's PSS to determine the basic timing of the cell, and then detects the SSS to determine the full timing of the cell as well as the cell identity. The SSS is a combination of two sequences, so-called short codes, of length 31. There are 31 variants of each of them, but only 168 different combinations are actually allowed. The two short codes are interleaved in the frequency domain, as illustrated by the differently marked REs in FIG. 6, forming the full SSS. The SSS is sent in subframes 0 and 5 for FDD, or in the downlink pilot timeslot (DwPTS) subframes following these slots for TDD. The interleaving of short codes alternates between these two subframes, i.e., which short code that is sent on the lowest-numbered subcarrier, so that detecting the SSS also enables the UE to determine which subframe that is number 0, and hence the full timing of the cell. In addition, the actual identity of the SSS, one of 168, together with the three possible variants of PSS give the complete identity of the cell.

Detection of SSS is often done by coherent correlation, which is particularly useful when the PSS is sent immediately preceding the SSS, as in FDD LTE. In TDD LTE the distance in time between PSS and SSS is, as noted above, 3 OFDM symbols, which may degrade performance at high Doppler speeds.

Figure 7:
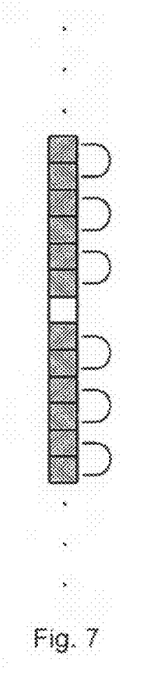
FIG. 7 schematically illustrates pairing within an OFDM symbol comprising a secondary synchronisation signal, according to an embodiment.
Figure 8:
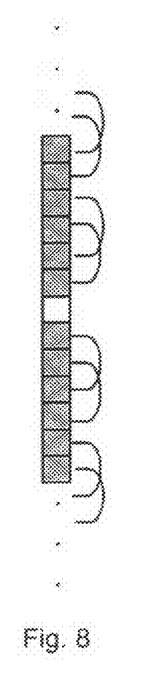
FIG. 8 schematically illustrates pairing within an OFDM symbol comprising a secondary synchronisation signal, according to an embodiment.

By making pair-wise comparisons across frequency, a procedure for SSS detection can be constructed that is less sensitive to Doppler, as it only uses REs during a single OFDM symbol in time, i.e. when SSS is, potentially, sent. The pairs can be formed either by pairing adjacent, in the frequency domain, REs, as illustrated by arcs in FIG. 7, or by pairing REs two subcarriers apart, as illustrated by arcs in FIG. 8. In the former case, the set of possible signals consist of the 168 possible combinations of short codes, whereas in the latter case we detect each short code separately from a set of 31 possible ones. The former procedure thus involves more computations, but since the REs in each pair are closer in frequency, it is less sensitive to channel delay spread. In all other senses, the principles demonstrated above apply.

Figure 9:
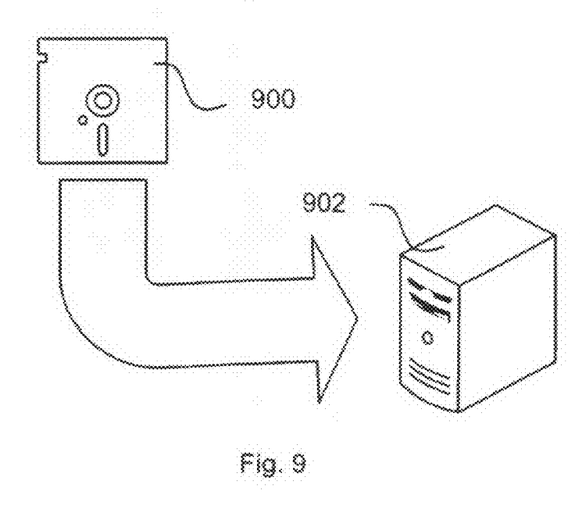
FIG. 9 schematically illustrates a computer-readable medium.

The methods according to the present invention are suitable for implementation with aid of processing means, such as computers and/or processors. Therefore, there is provided computer programs, comprising instructions arranged to cause the processing means, processor, or computer to perform the steps of any of the methods according to any of the embodiments described with reference to any of FIGS. 3 to 8. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to any of FIGS. 3 to 8. The computer 902 and computer program product 900 can be arranged to execute the program code sequentially where actions of the any of the methods are performed stepwise, but can also be arranged to perform the actions on a real-time basis, i.e. actions are performed upon request and/or available input data. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

Figure 10:
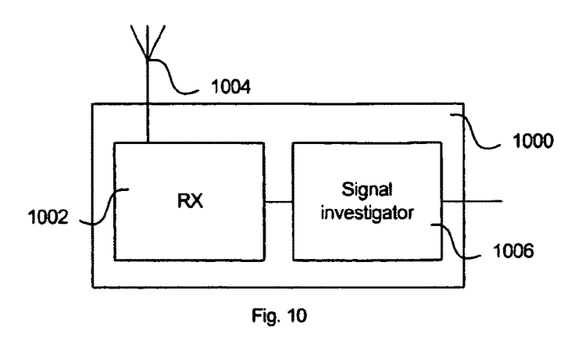
FIG. 10 is a block diagram schematically illustrating a receiver arrangement.

The approach can be used in a receiver arrangement 1000, as schematically illustrated in FIG. 10. The receiver arrangement 1000 comprises receiving circuitry 1002, which downconverts and demodulates an OFDMA transmission received via one or more antennas 1004, and outputs resource blocks to a signal investigator 1006 of the receiver arrangement 1000. The signal investigator 1006, which preferably is a signal processor, is arranged to perform the actions according to any of the embodiments described with reference to any of FIGS. 3 to 8, which can be implemented as described with reference to FIG. 9. The receiver arrangement 1000 can also comprise a comparator arranged to compare the statistical test value, as elucidated above, with a threshold associated with a quantile for a statistical distribution of the test value, and thus determine the investigated signal present if the test value is below the threshold, and missing if above the threshold. The receiver arrangement 1000 can also comprise an estimator arranged to estimate the number of transmit antennas used at a transmitting station making the OFDMA transmission by determining presence of signals associated with antenna ports as described above. The receiver arrangement 1000 can further comprise a signal determinator arranged to investigate statistical test values for each possible signal, and thereby determining the received signal as the one having smallest associated test value. Any of the comparator, estimator, and signal determinator can be integrated with or included in the signal investigator 1006.

Figure 11:
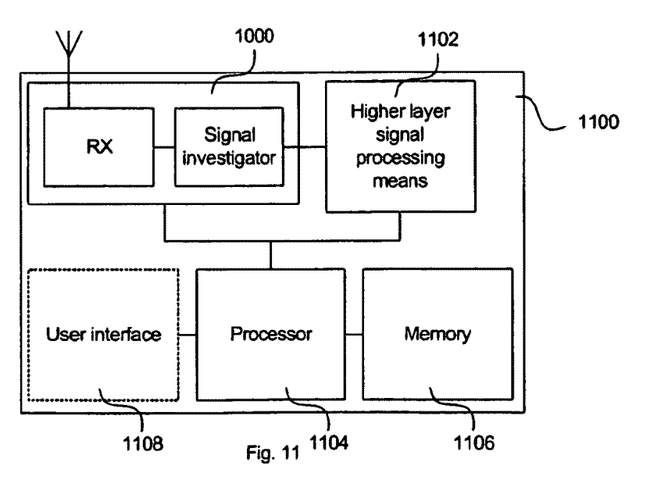
FIG. 11 is a block diagram schematically illustrating a communication apparatus.

The receiver arrangement 1000 can be used in a communication apparatus 1100, as illustrated in FIG. 11. The communication apparatus 1100 can be a mobile telephone, a communication card in a computer, or any other apparatus arranged to perform communications in an OFDMA communication system. The communication apparatus 1100 comprises the receiver arrangement 1000, which provides its output to higher layer signal processing means 1102 of the communication apparatus 1100. The communication apparatus 1100 preferably further comprises a processor 1104 arranged to control operations of the communication apparatus 1100. The signal investigator 1006 of the receiver arrangement 1000 can be integrated with the processor 1104, which then performs the actions elucidated above. The processor 1104 preferably works with aid of a memory 1106, which is arranged to store and provide work and/or content information. Optionally, if the communication apparatus 1100 is an apparatus to be operated directly by a user, such as a mobile phone, the communication apparatus 1100 can comprise a user interface 1108, which can comprise input and output means such as microphone, speaker, display screen, keys, joystick, touchpad, touch sensitive screen, etc.

The invention claimed is:

1. A method of determining whether one or more expected signals is received within a set of OFDMA resource elements, said method comprising:
   receiving an OFDMA transmission on said OFDMA resource elements;
   forming resource element pairs, wherein the resource elements in each resource element pair are selected from disjoint sets of said OFDMA resource elements, and wherein the disjoint sets of said OFDMA resource elements represent possible locations for the one or more expected signals;
   for each resource element pair, comparing received signals on each resource element of the resource element pair by multiplying the received signals by a complex conjugate of one of the one or more expected signals to generate two resulting products and calculating, by processing circuitry a difference between the resulting products to cancel out channel coefficients in the resulting products;
   determining, by the processing circuitry a statistical test value based on the difference between the resulting products in each resource element pair; and
   determining whether the one or more expected signals is present in the set of OFDMA resource elements by comparing the statistical test value to a threshold.

2. The method according to claim 1, wherein the statistical test value is:

$$\sum_{a=1}^{n} |z_{1a} - z_{2a}|^2,$$

where n is the number of the resource element pairs formed, a is an index of the resource element pairs, $z_{1a}$ is a product of signal received on a first resource element in resource element pair a multiplied by a complex conjugate of one of the one or more expected signals, and $z_{2a}$ is a product of a signal received on the other resource element in resource element pair a multiplied by a complex conjugate of one of the one or more expected signals.

3. The method according to claim 2, wherein a statistical distribution of the statistical test value is:

$\sigma^2 \chi^2(2n)$, and the threshold is associated with a quantile of the statistical distribution of the statistical test value.

4. The method according to claim 1, wherein the statistical test value is defined as:

$$F = \frac{\sum_{a=1}^{n} |z_{1a} - z_{2a}|^2}{2n}},$$

where n is the number of the resource element pairs formed, a is an index of the resource element pairs, $z_{1a}$ is a product of a signal received on a first resource element in resource element pair a multiplied by a complex conjugate of one of the one or more expected signals, $z_{2a}$ is a product of a signal received on the other resource element in resource element pair a multiplied by a complex conjugate of one of the one or more expected signals, and A is a test value evaluated on pairs of selected resource elements of which the one or more expected signals are known to be present, and A is defined as:

$$\frac{\sum_{b=1}^{m} |z'_{1b} - z'_{2b}|^2}{2m},$$

where m is the number of pairs of selected resource elements on which the one or more expected signals are known to be present, $z'_{1b}-z'_{2b}$ is a correlation value for selected resource element pair b, b is an index of the selected resource element pair, $z'_{1b}$ is a product of a signal received on a first resource element in selected resource element pair b multiplied by a complex conjugate of one of the one or more expected signals, $z'_{2b}$ is a product of a signal received on the other resource element in selected resource element pair b multiplied by a complex conjugate of one of the one or more expected signals.

5. The method according to claim 4, wherein a statistical distribution of the statistical test value is an F-distribution with 2n, 2m degrees of freedom.

6. The method according to claim 1, wherein the statistical test value is:

$|Z_1|^2 + |Z_2|^2 - 2|Z_1^H Z_2|$, where $Z_1$ and $Z_2$ are vectors of length n with elements $z_{1a}$ and $z_{2a}$ respectively, n is the number of the resource element pairs formed, $z_{1a}$ is a product of a signal received on a first resource element in resource element pair a multiplied by a complex conjugate of one of the one or more expected signals, $z_{2a}$ is a product of a signal received on the other resource element in the resource element pair a multiplied by a complex conjugate of one of the one or more expected signals, and superscript H denotes a Hermitian transpose.

7. The method according to claim 6, wherein a statistical distribution of the test value is:

$\sigma^2 \chi^2(2n-2)$, and the threshold is associated with a quantile of the statistical distribution of the test value.

8. The method according to claim 1, wherein the statistical test value is:

$$F = \frac{\frac{|Z_1|^2 + |Z_2|^2 - 2|Z_1^H Z_2|}{2n-2}}{\frac{|Z'_1|^2 + |Z'_2|^2 - 2|Z'^H_1 Z'_2|}{2m-2}},$$

where $Z_1$ and $Z_2$ are vectors of length n with elements $z_{1a}$ and $z_{2a}$, respectively, where n is the number of pairs, $z_{1a}$ is a product of a signal received on a first resource element in resource element pair a multiplied by a complex conjugate of one of the one or more expected signals, $z_{2a}$ is a product of a signal received on the other resource element in the resource element pair a multiplied by a complex conjugate of one of the one or more expected signals, a is an index of the resource element pairs, $Z'_1$ and $Z'_2$ are vectors of length m with elements $z'_{1b}$ and $z'_{2b}$, respectively, where m is the number of pairs in a second set of pairs of resource elements selected from the resource grid, on which the one or more expected signals are known to be present, $z'_{1b}$ is a product of a signal received on a first resource element in resource element pair b multiplied by a complex conjugate of one of the one or more expected signals, $z'_{2b}$ is a product of a received signal and a complex conjugate of one of the one or more expected signals for a signal of the other resource element of pair b, b is an index of the second set of resource element pairs and superscript H denotes a Hermitian transpose.

9. The method of claim 8, wherein a statistical distribution of the statistical test value is an F-distribution with 2n−2, 2m−2 degrees of freedom.

10. The method of claim 1, wherein forming any of the resource element pairs comprises determining reference signals associated to a certain transmit antenna port such that the determining of whether the one or more expected signals is present includes estimating of a number of transmit antennas used at a transmitting station to make the transmission of the one or more expected signals.

11. The method of claim 1, wherein the determining of the statistical test value is made for each possible signal of the resource elements, and further comprises determining the possible signal having a smallest statistical value, such that a received signal is considered to be the possible signal having the smallest statistical value.

12. The method of claim 11, wherein signals of the resource elements of the recourse element pairs comprise a secondary synchronization signal short code set, and a formation of the resource element pairs comprises selecting signals of the resource elements of the resource element pairs from one OFDM symbol.

13. The method of claim 12, wherein the resource elements of each pair are selected from adjacent subcarriers.

14. The method of claim 12, wherein the resource elements of each pair are selected from subcarriers that are two subcarriers apart.

15. The method of claim 1, further comprising substituting a signal of a resource element of any of the resource element pairs with an average signal of at least two other signals of resource elements before the comparing.

16. A non-transitory computer-readable medium storing computer program code comprising instructions to cause a processor on which the computer program code is executed to perform the method according to claim 1.

17. A receiving arrangement comprising
- a receiver arranged to receive an OFDMA transmission and obtain a resource grid comprising resource elements of the transmission; and
- a signal processor for investigating whether one or more expected signals are received in the OFDMA transmission, the signal processor being arranged to:
  - receive the OFDMA transmission on said OFDMA resource elements;
  - form resource element pairs, wherein the resource elements in each resource element pair are selected from disjoint sets of said OFDMA resource elements, and wherein the disjoint sets of said OFDMA resource elements represent possible locations for the one or more expected signals;
  - for each resource element pair, compare received signals on each resource element of the resource element pair by multiplying the received signals by a complex conjugate of one of the one or more expected signals to generate two resulting products and determine a difference between the resulting products to cancel out channel coefficients in the resulting products;
  - determine a statistical test value based on the difference between the resulting products of each resource element pair; and
  - determine whether the one or more expected signals is present in the set of OFDMA resource elements by comparing the statistical test value to a threshold.

18. The receiving arrangement of claim 17, further comprising an estimator arranged to estimate a number of transmit antennas used at a transmitting station to make the transmission by determining reference signals associated to a certain transmit antenna port such that a determination of whether the one or more expected signals is present includes an estimate of the transmit antennas used to make the transmission of the one or more expected signals.

19. The receiving arrangement of claim 17, further comprising a signal determinator arranged to determine the statistical test value for each possible signal of the resource elements, and to determine the possible signal having a smallest statistical test value, such that a received signal is considered to be the possible signal having the smallest statistical test value.

20. A communication apparatus comprising a receiving arrangement according to claim 17.

* * * * *

UNITED STATES PATENT AND TRADEMARK OFFICE
CERTIFICATE OF CORRECTION

PATENT NO. : 8,547,821 B2
APPLICATION NO. : 12/921926
DATED : October 1, 2013
INVENTOR(S) : Lindoff et al.

It is certified that error appears in the above-identified patent and that said Letters Patent is hereby corrected as shown below:

On the title page, item (75), under "Inventors", in Column 1, Line 2,
delete "Täisy" and insert -- Täby --, therefor.

In the Specifications

In Column 1, Line 47, delete "in." and insert -- in --, therefor.

In Column 2, Line 24, delete "ODFM" and insert -- OFDM --, therefor.

In Column 2, Line 42, delete "$\hat{s}_{i,k} = \hat{h}_{i,k}^{1} y_{i,k}$" and insert -- $\hat{s}_{i,k} = \hat{h}_{i,k}^{-1} y_{i,k}$ --, therefor.

In Column 7, Line 53, delete "$\chi^2$," and insert -- $\sigma^2$, --, therefor.

In Column 7, Line 60, delete "$C'' \epsilon \sigma^2 \chi^2 (2m).$" and insert -- $C' \epsilon \sigma^2 \chi^2 (2m).$ --, therefor.

In Column 8, Line 46, delete "from in" and insert -- from m --, therefor.

In the Claims

In Column 12, Line 61, in Claim 2, delete "of signal" and insert -- of a signal --, therefor.

In Column 13, Line 37, in Claim 4, delete "$z'_{1b}-z_{2b}$" and insert -- $z'_{1b}-z'_{2b}$ --, therefor.

In Column 15, Line 3, in Claim 17, delete "comprising" and insert -- comprising: --, therefor.

Signed and Sealed this
Thirteenth Day of May, 2014

Michelle K. Lee
*Deputy Director of the United States Patent and Trademark Office*